United States Patent [19]

Pickert

[11] Patent Number: 5,311,571
[45] Date of Patent: May 10, 1994

[54] METHOD AND APPARATUS FOR PERFORMING INBOUND CALLING IN A WIRELESS COMMUNICATION SYSTEM HAVING FIXED COMMUNICATION UNITS COUPLED TO A TELEPHONE SYSTEM BY A TELEPHONE LINE SHARED IN COMMON

[75] Inventor: William F. Pickert, Hoffman Estates, Ill.

[73] Assignee: Motorola, Inc., Schaumburg, Ill.

[21] Appl. No.: 882,994

[22] Filed: May 14, 1992

[51] Int. Cl.⁵ .................. H04M 11/00; H04M 1/64; H04B 1/00
[52] U.S. Cl. ........................ 379/58; 379/60; 379/61; 379/62; 379/89; 455/56.1
[58] Field of Search ................ 379/39, 56, 57, 58, 379/59, 60, 61, 62, 89; 455/56.1

[56] References Cited

U.S. PATENT DOCUMENTS

| | | | |
|---|---|---|---|
| 4,670,899 | 6/1987 | Brody et al. | 379/60 |
| 4,961,217 | 10/1990 | Akiyama | 379/89 |
| 5,123,043 | 6/1992 | Higashiyama et al. | 379/62 |
| 5,170,488 | 12/1992 | Furuya | 455/56.1 |
| 5,195,127 | 3/1993 | Ichikawa et al. | 379/58 |
| 5,218,628 | 6/1993 | Ito | 379/58 |
| 5,243,641 | 9/1993 | Evans et al. | 379/61 |

FOREIGN PATENT DOCUMENTS

| | | | |
|---|---|---|---|
| 0475348 | 3/1992 | European Pat. Off. | 379/60 |
| 4125907 | 2/1992 | Fed. Rep. of Germany | 379/62 |
| 0168744 | 6/1990 | Japan | 379/62 |
| 4070021 | 3/1992 | Japan | 379/62 |

OTHER PUBLICATIONS

ETSI, Radio Equipment and Systems, Digital European Cordless Communications Common Interface Part 1, Overview, Draft, Aug. 1991.

Mende, W. "On the Hand-Over Rate in Future Cellular Systems", IEEE, 1988.

Primary Examiner—Curtis Kuntz
Assistant Examiner—William D. Cumming
Attorney, Agent, or Firm—R. Louis Breeden; Thomas G. Berry

[57] ABSTRACT

A wireless communication system includes a portable communication unit (PCU) (120) and a plurality of fixed communication units (FCUs) (102) covering a plurality of radio coverage areas (108, 110, 112). The FCUs are coupled to a telephone system (114) by telephone lines (116) shared in common by the FCUs (102). The PCU (120) is associated with one of the telephone lines (116) for receiving an incoming call. THE FCUs (102) are coupled to the telephone line (116) in response to an incoming call, and signals are transmitted from the FCUs (102) to establish a wireless link with the called PCU (120). When one of the FCUs (102) receives a response from the called PCU (120), the receiving FCU (102) establishes the wireless link and the rest of the FCUs (102) stop further signal transmissions.

4 Claims, 4 Drawing Sheets

METHOD AND APPARATUS FOR PERFORMING INBOUND CALLING IN A WIRELESS COMMUNICATION SYSTEM HAVING FIXED COMMUNICATION UNITS COUPLED TO A TELEPHONE SYSTEM BY A TELEPHONE LINE SHARED IN COMMON

FIELD OF THE INVENTION

This invention relates in general to radio communication systems, and more specifically to two-way radio communication systems comprising a method and apparatus for performing hand-off and inbound calling from a telephone system.

Background of the Invention

Two-way radio communication systems that support hand-off and inbound calling from a telephone system are well known in the art. An example of such a system is a cellular mobile telephone system. Other systems such as those based on the Digital European Cordless Telecommunications (DECT) standard have been proposed and are under development by equipment vendors around the world.

Conventional systems that have a plurality of radio coverage areas defined by a limited transmission distance of one or more fixed communication units (FCUs) in each of the areas require a centralized controller and switching system in order to support hand-off and inbound calling. The centralized controller and switching system maintain a location registration database for each portable communication unit (PCU) active in the system, and a call registry for each call taking place in the system. The location registration database is required for routing each inbound call to a radio coverage area in which a called PCU is located. The call registry is required for uniquely associating each PCU with a telephone circuit destination or path through the switch, so that after a hand-off the PCU is connected to the same party as before the hand-off.

A wireless communication system based on the DECT standard is considered by those skilled in the art to be a good choice for private business applications. This is because the DECT standard provides a protocol that can support hand-off, inbound calling, various data transmission modes, and a high traffic density as required for many private business applications. In large scale private applications having many PCUs and many FCUs, a central controller and switch for providing hand-off and inbound calling is a reasonable solution, because the cost of the controller and switch is a small fraction of the cost of the whole system. However, in small scale private applications having perhaps only two or three FCUs and a handful of PCUs, the cost of a central controller and switch can represent a large fraction of the total system cost. Still, small systems with a plurality of radio coverage areas nevertheless require hand-off capability as a PCU moves from one radio coverage area to another, and PCUs must be able to receive an incoming call ubiquitously, i. e., in more than just a single "home" radio coverage area for each PCU.

Thus, what is needed is an economical solution to providing hand-off and inbound calling in a small scale private wireless communication system. That is, a solution is needed that does not require a central controller and switch, and that does not substantially increase the cost of the wireless communication system.

SUMMARY OF THE INVENTION

One aspect of the present invention is a method of handling an incoming call in a wireless communication system comprising a portable communication unit (PCU) having a PCU identification code, and a plurality of fixed communication units (FCUs) having associated therewith a plurality of radio coverage areas. The plurality of FCUs are coupled to a telephone system by a telephone line shared in common by the plurality of FCUs for handling calls to and from the PCU. The PCU is associated with the telephone line for receiving the incoming call. The method comprises the steps of coupling the plurality of FCUs to the telephone line shared in common by the plurality of FCUs in response to the incoming call, and transmitting signals thereafter from the plurality of FCUs for establishing a wireless communication link with the PCU associated with the telephone line receiving the incoming call. The method further comprises the steps of establishing the wireless communication link between a communicating one of the plurality of FCUs and the PCU in response to the communicating one of the plurality of FCUs receiving a responding transmission from the PCU, and ending thereafter the signals transmitted from the plurality of FCUs for establishing the wireless communication link from the plurality of FCUs.

Another aspect of the present invention is a fixed communication unit (FCU) for use in a wireless communication system comprising a portable communication unit (PCU) having a PCU identification code, and a plurality of FCUs having associated therewith a plurality of radio coverage areas. The plurality of FCUs are coupled to a telephone system by a telephone line shared in common by the plurality of FCUs and having a telephone line number for handling calls to and from the PCU. The PCU is associated with the telephone line for receiving an incoming call, and the FCU comprises apparatus for handling the incoming call received on the telephone line. The apparatus comprises an incoming call detector for detecting the incoming call, and a selector coupled to the incoming call detector for coupling the plurality of FCUs to the telephone line shared in common by the plurality of FCUs in response to the detected incoming call. The apparatus further comprises a processor coupled to the incoming call detector for controlling the FCU in response to the detected incoming call, and a memory coupled to the processor for storing a PCU identification code and a telephone line number, the telephone line number being stored in a memory location associated with the PCU identification code. The apparatus also includes a signaling element coupled to the memory for transmitting signals from the plurality of FCUs coupled by the selector to the telephone line, for establishing a wireless communication link with the PCU having the PCU identification code associated in the memory with the telephone line number of the telephone line receiving the incoming call. In addition, the apparatus includes a link establishment element for establishing a wireless communication link between a communicating one of the plurality of FCUs and the PCU, and a control element for controlling activities of the plurality of FCUs. The control element comprises a termination element for terminating the signals transmitted for establishing the wireless communication link in the plurality of FCUs, and a uncoupling element for uncoupling the plurality of FCUs from the telephone line, except for the communicating one of the plurality of FCUs.

DESCRIPTION OF A PREFERRED EMBODIMENT

Figure 1:
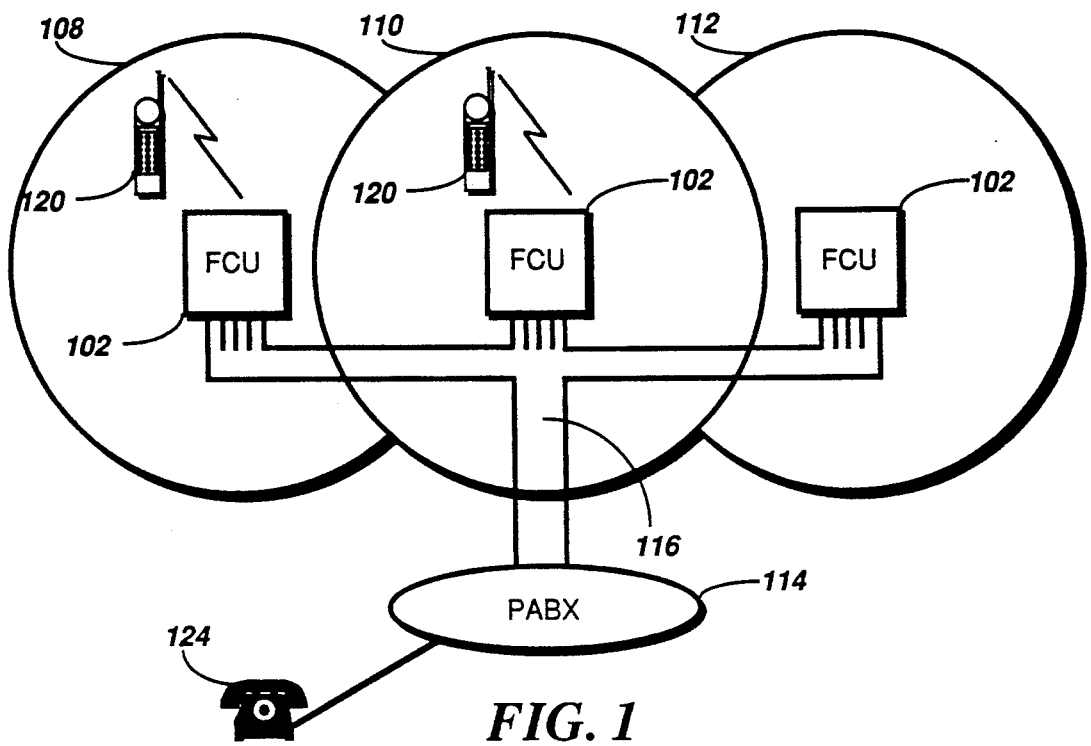
FIG. 1 is a block diagram of a wireless communication system in accordance with a preferred embodiment of the present invention.

With reference to FIG. 1, a preferred embodiment of a wireless communication system according to the present invention comprises a plurality of fixed communication units (FCUs) 102 that provide radio coverage in a plurality of radio coverage areas 108, 110, 112. The FCUs are coupled to a private automatic branch exchange (PABX) 114 telephone system by a plurality of common telephone lines 116, i.e., each of the telephone lines 116 is shared in common by the plurality of FCUs 102. Those skilled in the art will recognize that the wireless communication system according to the present invention can also be used with telephone systems other than a PABX, e.g., the public switched telephone network (PSTN). The system further comprises at least one portable communication unit (PCU) 120 having hand-off capability and transmitting and receiving in a time division multiple access and time division duplex (TDMA/TDD) digital format. The system further comprises at least one wired telephone set 124 for generating an inbound call for a PCU 120.

The hand-off method according to the present invention exploits the ability of the PCU 120 using TDMA/TDD to sample time slots other than a time slot currently being used for user communication with a first FCU 102. By sampling other time slots the PCU 120 can determine whether there is the possibility of obtaining a wireless link from a second FCU 102 having a transmission quality better than that of the link currently in use. If so, the PCU 120 requests a hand-off to the second FCU 102. As the PCU 120 is capable of determining the need for a hand-off and then making that need known to an FCU 102, the preferred embodiment of the wireless communication system according to the present invention is able to perform the hand-off without a central controller and switch, by a method and apparatus that will be described further in more detail herein below.

Further enabling the wireless communication system according to the present invention is the use of a standard protocol for communication between the plurality of FCUs and the at least one PCU. The standard protocol defines messages and procedures for requesting and establishing wireless communication links, for transmitting and receiving signaling data, for transmitting and receiving user communications, and for defining the TDMA/TDD format used therefor. An example of such a standard protocol is the Digital European Cordless Telecommunications (DECT) standard. The DECT standard is fully defined in the European Telecommunication Standard document prETS 300 175 entitled "Digital European Cordless Telecommunications Common Interface," dated August 1991, and produced by the European Telecommunications Standards Institute.

Figure 2:
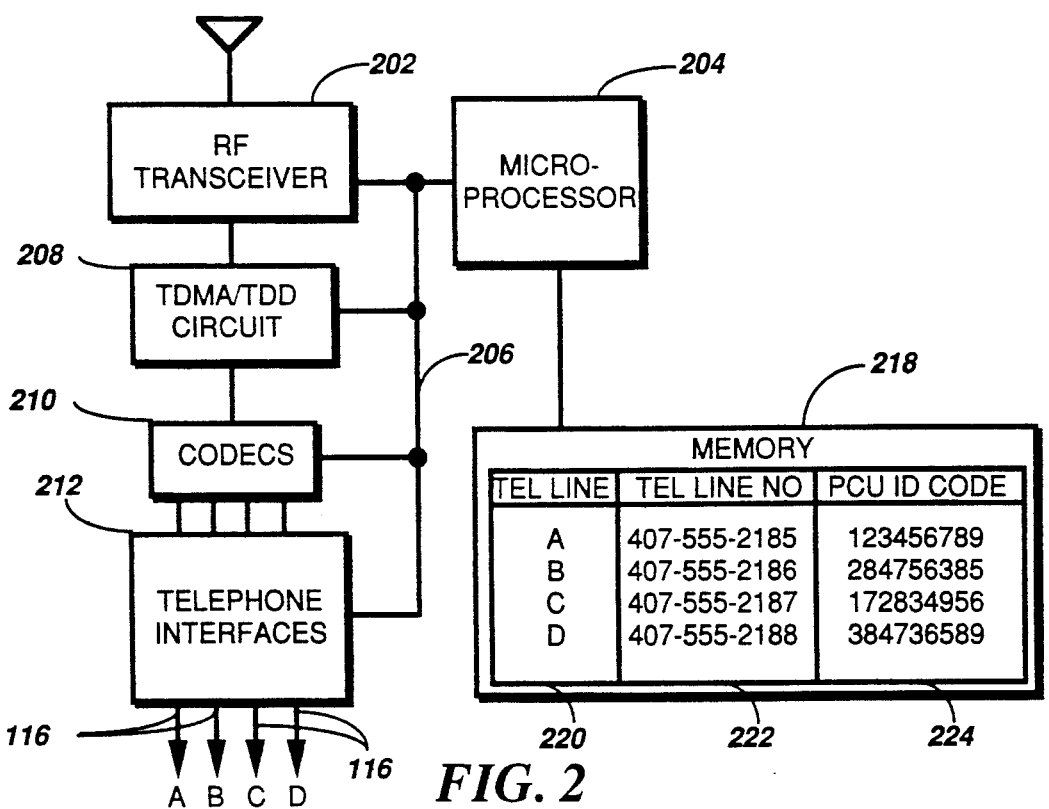
FIG. 2 is a block diagram of a fixed communication unit (FCU) in accordance with the preferred embodiment of the present invention.

With reference to FIG. 2, a preferred embodiment of an FCU 102 (FIG. 1) according to the present invention comprises a radio frequency (RF) transceiver 202 for transmitting and receiving radio signals comprising digital information transmitted and received in a TDMA/TDD format. The RF transceiver is coupled to a microprocessor 204 for controlling the transceiver 202 by a bus 206. The RF transceiver 202 is also coupled to a TDMA/TDD circuit 208 for interfacing the RF transceiver 202 with a plurality of CODECs 210 for performing audio-to-digital and digital-to-audio conversions of signals transmitted and received, respectively, by the FCU 102. The plurality of CODECs 210 are coupled to a plurality of telephone interfaces 212 for detecting ringing signals on a plurality of telephone lines 116 and for coupling one of the telephone lines 116 to one of the CODECs in response to an inbound or outbound call. The TDMA/TDD circuit 208, the CODECs 210, and the telephone interfaces 212 are all coupled to the bus 206 for providing control by the microprocessor 204. A memory 218 is also coupled to the microprocessor for storing program control software and for storing a list 220 of telephone line physical connections (A, B, C, D, etc.), a list 222 of the unique telephone line numbers corresponding to each of the telephone line physical connections, and a list 224 of PCU identification codes corresponding to each of the unique telephone line numbers, for the purpose of receiving inbound calls on the telephone lines 116.

Figure 3:
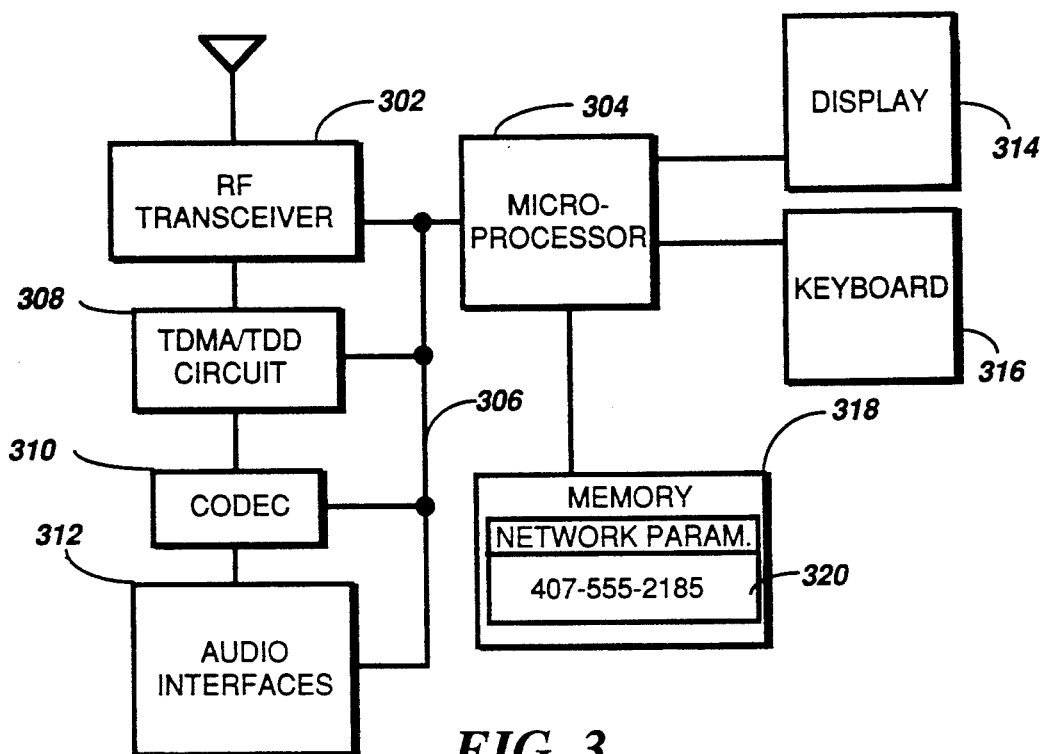
FIG. 3 is a block diagram of a portable communication unit (PCU) in accordance with the preferred embodiment of the present invention.

With reference to FIG. 3, a PCU 120 (FIG. 1) comprises an RF transceiver 302 for transmitting and receiving radio signals comprising digital information transmitted and received in a TDMA/TDD format. The RF transceiver is coupled to a microprocessor 304 for controlling the transceiver 302 by a bus 306. The RF transceiver 302 is also coupled to a TDMA/TDD circuit 308 for interfacing the RF transceiver 302 with a CODEC 310 for performing audio-to-digital and digital-to-audio conversions of signals transmitted and received, respectively, by the PCU 120. The CODEC 310 is coupled to audio interfaces 312 for sending and receiving audio signals to and from a user of the PCU 120. The TDMA/TDD circuit 308, the CODEC 310, and the audio interfaces 312 are all coupled to the bus 306 for providing control by the microprocessor 304. A memory 318 is also coupled to the microprocessor 304 for storing program control software and for storing a unique telephone line number 320 received in accordance with the present invention from an FCU 102 (FIG. 1) as a "network parameter" used for controlling a hand-off. Also coupled to the microprocessor 304 are a display 314 for displaying information sent from the microprocessor 304 and a keyboard 316 for receiving control input from the user.

Figure 4:
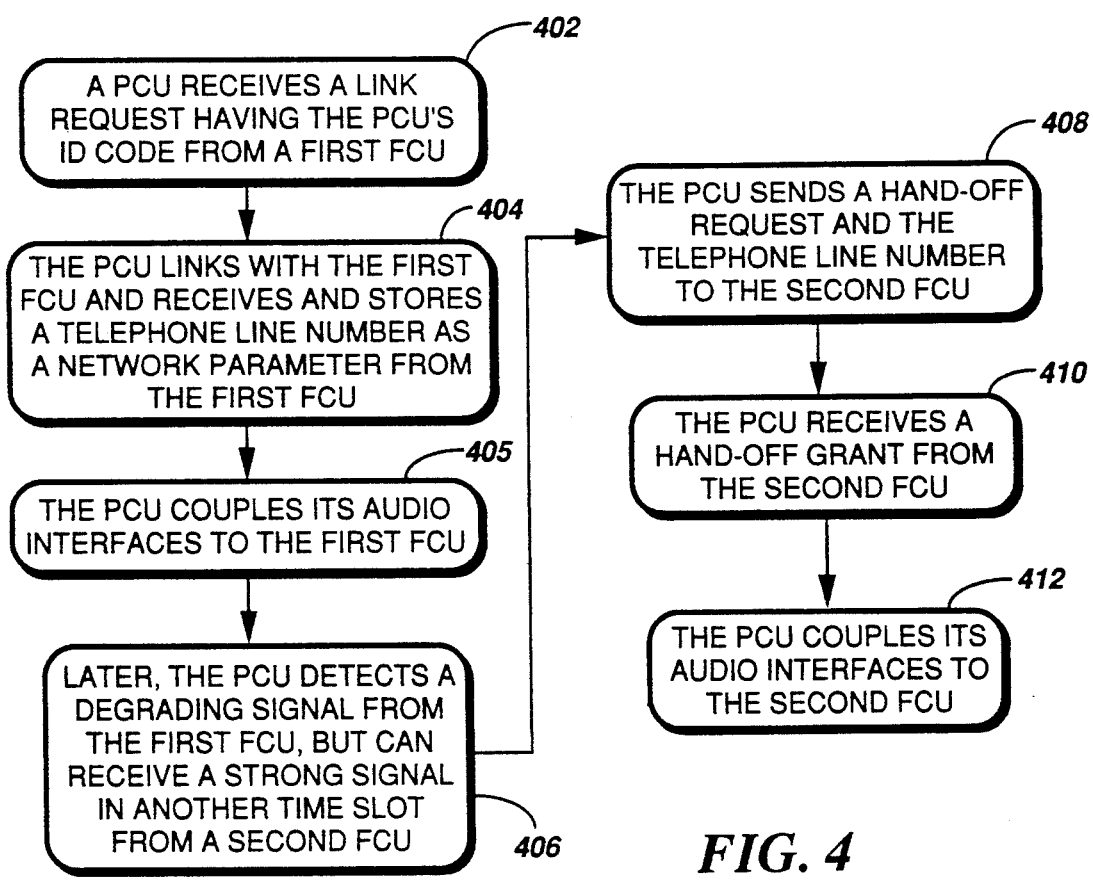
FIG. 4 is a flow chart of a method in a PCU of initializing for a hand-off and then performing the hand-off in accordance with the preferred embodiment of the present invention.

With reference to FIG. 4, a flow chart depicting a method of initializing for a hand-off and then performing the hand-off in the PCU 120 (FIG. 1) comprises receiving 402 a link request having the identification code of the PCU 120 from a first FCU 102 (FIG. 1). In response, in step 404 the PCU 120 links with the first FCU 102. This is followed by receiving the unique telephone line number as the network parameter and string the unique telephone line number 320 (FIG. 3) in the memory 318 of the PCU 120 in accordance with the present invention. Having finished initializing for a possible hand-off, the PCU 120 couples 405 its audio interfaces 312 (FIG. 3), to the link with the first FCU 102, so that user communication can begin.

Time passes, and the PCU 120 detects 406 a degrading signal from the first FCU 102, but can receive a strong signal in a second time slot served by a second FCU 102. The PCU 120 then links with the second FCU using the second time slot, and sends 408 a hand-off request comprising the unique telephone line number to the second FCU 102 in accordance with the present invention, while temporarily maintaining the initial coupling between the audio interfaces 312 and the link with the first FCU until the hand-off can be completed. In response, the PCU 120 receives 410 a hand-off grant from the second FCU 102 to indicate that the FCU 102 is ready to take the hand-off. In response, the PCU 120 completes the hand-off by coupling 412 the audio interfaces 312 (FIG. 3) to the second FCU 102 using the second time slot and decoupling from the link with the first FCU 102, so that user communication can continue through the second FCU 102 on the same telephone line 116 used at the start of the call and identified by the unique telephone line number 320 (FIG. 3).

Figure 5:
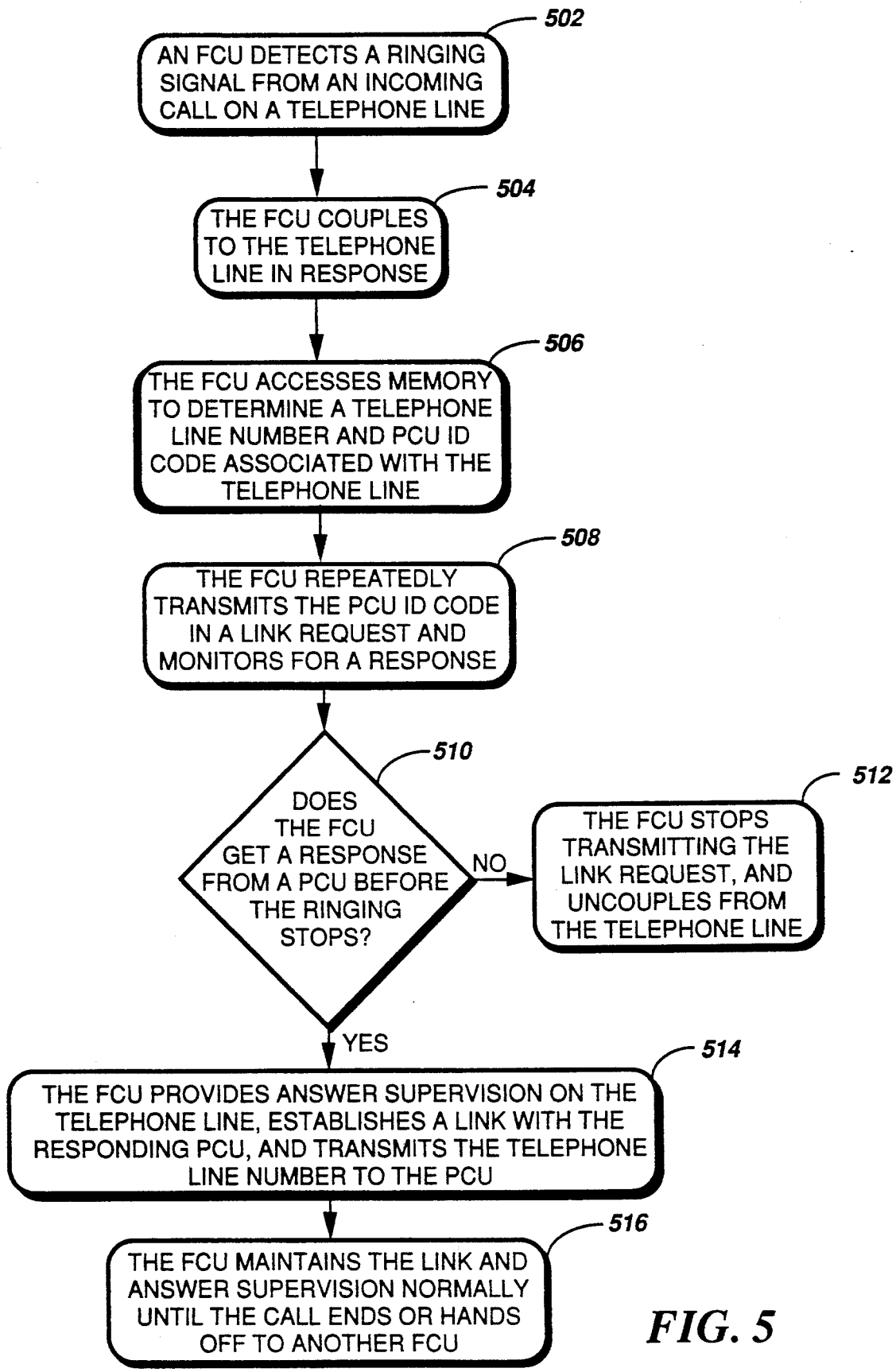
FIG. 5 is a flow chart of a method in an FCU of handling an inbound call including initializing a network parameter for a hand-off in accordance with the preferred embodiment of the present invention.

With reference to FIG. 5, a flow chart of a method in an FCU of handling an inbound call including initializing a network parameter for a hand-off in accordance with the preferred embodiment of the present invention comprises the following steps. An FCU 102 (FIG. 1) detects 502 a ringing signal as a result of an incoming call on a telephone line 116 (FIG. 1). The FCU 102 couples 504 to the telephone line in response. Next, the FCU 102 accesses 506 the lists 220, 222, 224 (FIG. 2) in its memory 218 (FIG. 2) to determine a unique telephone line number and PCU identification code that are associated with the physical connection (A, B, C, D, etc.) of the telephone line. In response, the FCU 102 repeatedly transmits 508 on a transmit time slot the PCU identification code found in step 506 comprising a link request message, while monitoring receive time slots for a response. If in step 510 the FCU 102 does not receive a response before the ringing signal stops, then the FCU 102 stops transmitting the link request message and uncouples from the telephone line. The ringing signal normally stops either when a caller disconnects or when another FCU 102 has provided "answer supervision" for the incoming call by coupling a low resistance path across the telephone line 116, thus causing current flow in the telephone line 116 to indicate an "off hook" condition to the PABX 114 (FIG. 1).

If in step 510 the FCU 102 gets a response from a PCU 120 before the ringing stops, then in step 514 the FCU 102 provides answer supervision on the telephone line by the one of the telephone interfaces 212 (FIG. 2) serving the telephone line 116. In step 514 the FCU 102 also establishes a link with the responding PCU 120 and transmits the unique telephone line number to the PCU 120 to initialize the PCU 120 for a possible future hand-off. Finally, the FCU 102 maintains 516 the link and the answer supervision normally until the call ends or gets handed off to another FCU 102.

Figure 6:
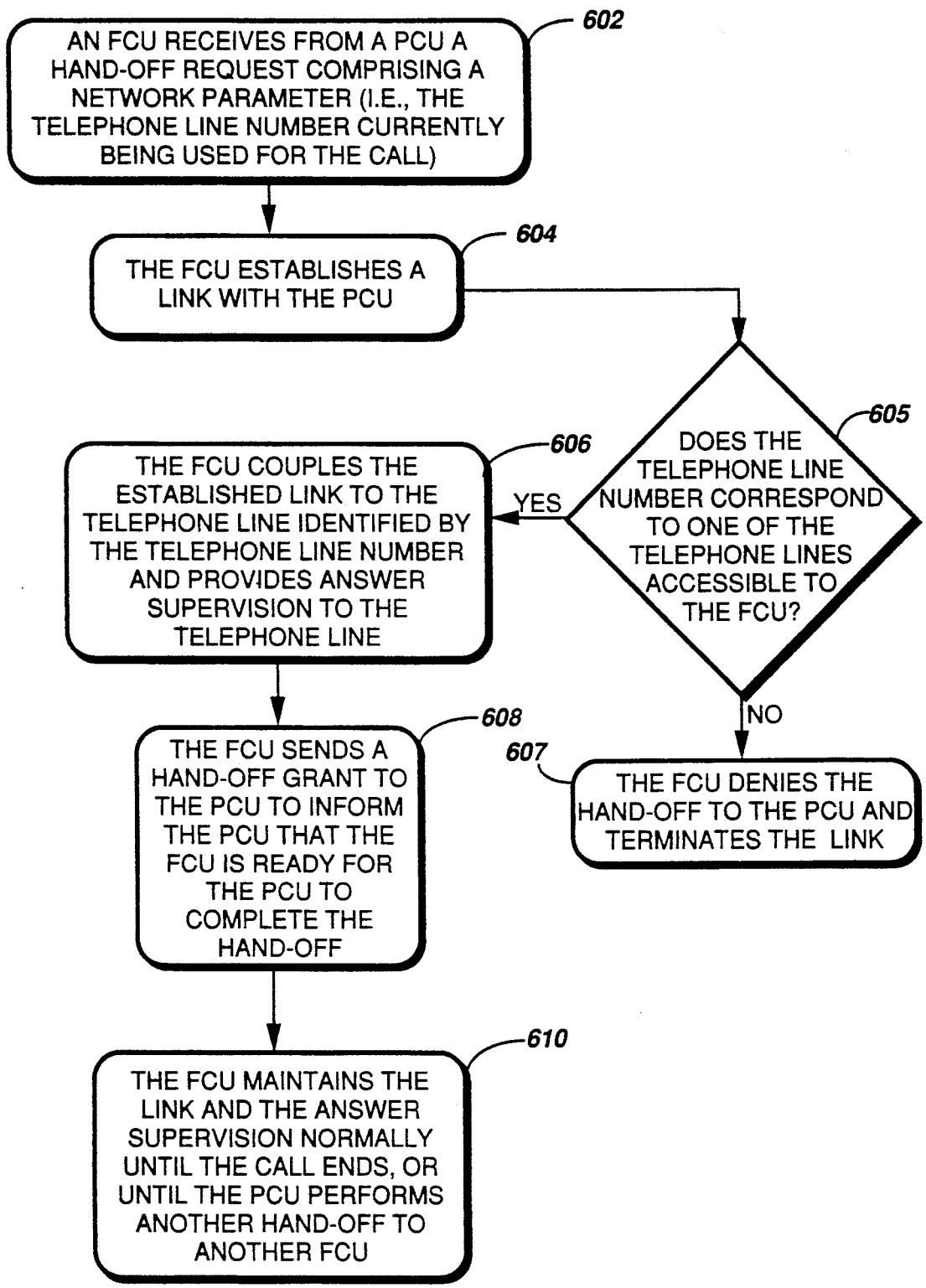
FIG. 6 is a method in an FCU of performing a hand-off in accordance with the preferred embodiment of the present invention.

With reference to FIG. 6, a method in an FCU 102 (FIG. 1) of performing a hand-off in accordance with the preferred embodiment of the present invention comprises receiving 602 a hand-off request from a PCU 120 (FIG. 1). The hand-off request comprises a network parameter comprising the unique telephone line number 320 (FIG. 3). In response, the FCU 102 establishes 604 a link with the PCU 120. If in step 605 the FCU 102 determines that the unique telephone line number 320 does not correspond to one of the telephone lines 116 (FIG. 1) that are accessible to the FCU 102, then the FCU 102 denies 607 the hand-off and terminates the link, leaving the PCU 120 to continue searching for an FCU 102 that can access the telephone line 116 necessary for accepting the hand-off.

On the other hand, if in step 605 the FCU 102 determines that the telephone number 320 corresponds to one of the telephone lines 116 accessible to the FCU 102, then the FCU 102 couples 606 the established link to the telephone line 116 corresponding to the unique telephone line number 320, the correspondence being determined from the lists 220, 222, 224 (FIG. 2) in the memory 218 (FIG. 2) of the FCU 102. In coupling to the telephone line 116 the FCU 102 also provides answer supervision to the telephone line 116. After coupling to the telephone line, the FCU 102 sends 608 a hand-off grant message to the PCU 120 to inform the PCU 120 that the FCU 102 is now ready for the PCU 120 to complete the hand-off. After the PCU 120 completes the hand-off by coupling its audio interfaces 312 (FIG. 3) to the link with the FCU 120, the FCU then maintains 610 the link and the answer supervision normally until the call ends or hands off to another FCU 102. After the completion of the hand-off to the new FCU 102, the old FCU 102 that still has the original established link with the PCU 120 then drops the original link and decouples from the telephone line 116 in response to the completion of the hand-off to the new FCU 120.

Those skilled in the art may recognize that when used in a single isolated environment, the embodiment of the wireless communication system according to the present invention could be simplified by eliminating the step of translating the physical connection of the telephone line into the corresponding unique telephone line number 320 (FIG. 3) used as the network parameter for controlling the hand-off. This simplification would succeed provided that the same physical connection of the telephone line 116 in each of the FCUs 102 (FIG. 1) in the system is used uniquely for each of the telephone lines in the system. Still, equipment capacity limitations and traffic requirements are likely to cause situations in which it is desirable to have two or more wireless communication systems in proximity to one another, both systems being compatible with and accessible by a common group of PCUs 120 (FIG. 1). In these situations it is essential that the network parameter for controlling the hand-off always uniquely identifies the telephone line being used for the call. Otherwise, the call could be handed off to a telephone line different from the one used at the start of the call. For that reason, the embodiment of the wireless communication system according to the present invention uses the full unique telephone line number 320 (FIG. 3) as the network parameter for controlling the hand-off.

Thus, the wireless communication system according to the present invention is an economical solution to providing hand-off and ubiquitous inbound calling in a wireless communication system. The present invention does not require a central controller and switch, and does not substantially increase the cost of the system beyond the cost of a similar conventional wireless communication system that does not offer hand-off and ubiquitous inbound calling capabilities. The present invention also provides a secure method to ensure that a hand-off cannot be completed to an incorrect telephone line belonging to a nearby separate, but compatible, system. The present invention is particularly suitable for a small scale private wireless communication system, in which the cost of common equipment must be kept as low as possible.

I claim:

1. In a wireless communication system comprising a portable communication unit (PCU) having a PCU identification code, and a plurality of fixed communication units (FCUs) having associated therewith a plurality of radio coverage areas, wherein the plurality of FCUs are coupled to a telephone system by a telephone line shared in common by the plurality of FCUs for handling calls to and from the PCU, and wherein the PCU is associated with the telephone line for receiving an incoming call, a method of handling the incoming call, the method comprising the steps of:
    coupling the plurality of FCUs to the telephone line shared in common by the plurality of FCUs in response to the incoming call;
    transmitting signals thereafter from the plurality of FCUs for establishing a wireless communication link with the PCU associated with the telephone line receiving the incoming call;
    establishing the wireless communication link between a communicating one of the plurality of FCUs and the PCU in response to the communicating one of the plurality of FCUs receiving a responding transmission from the PCU; and
    ending thereafter the signals transmitted from the plurality of FCUs for establishing the wireless communication link from the plurality of FCUs.

2. The method according to claim 1, wherein the transmitting step comprises the steps of:
    accessing a memory within the plurality of FCUs to determine the PCU identification code of the PCU associated with the telephone line receiving the incoming call;
    sending the PCU identification code determined in the accessing step in a link request transmission; and
    monitoring thereafter for a responding signal from the PCU.

3. The method according to claim 1, wherein the ending step comprises the step of uncoupling from the telephone line ones of the plurality of FCUs except for the communicating one.

4. A fixed communication unit (FCU) for use in a wireless communication system comprising a portable communication unit (PCU) having a PCU identification code, and a plurality of FCUs having associated therewith a plurality of radio coverage areas, wherein the plurality of FCUs are coupled to a telephone system by a telephone line shared in common by the plurality of FCUs and having a telephone line number for handling calls to and from the PCU, the PCU being associated with the telephone line for receiving an incoming call, wherein the FCU comprises apparatus for handling the incoming call received on the telephone line, the apparatus comprising:
    incoming call detection means for detecting the incoming call;
    selection means coupled to the incoming call detection means for coupling the plurality of FCUs to the telephone line shared in common by the plurality of FCUs in response to the detected incoming call;
    processor means coupled to the incoming call detection means for controlling the FCU in response to the detected incoming call;
    memory means coupled to the processor means for storing a PCU identification code and a telephone line number, the telephone line number being stored in a memory location associated with the PCU identification code;
    signaling means coupled to the memory means for transmitting signals from the plurality of FCUs coupled by the selection means to the telephone line, for establishing a wireless communication link with the PCU having the PCU identification code associated in the memory means with the telephone line number of the telephone line receiving the incoming call;
    link establishment means for establishing a wireless communication link between a communicating one of the plurality of FCUs and the PCU; and control means for controlling activities of the plurality of FCUs, the control means comprising:
    termination means for terminating the signals transmitted for establishing the wireless communication link in the plurality of FCUs; and
    uncoupling means for uncoupling the plurality of FCUs from the telephone line, except for the communicating one of the plurality of FCUs.

* * * * *